2,880,036
MATERIAL SUPPLY CUT-OFF IN PNEUMATIC CONVEYING PLANTS

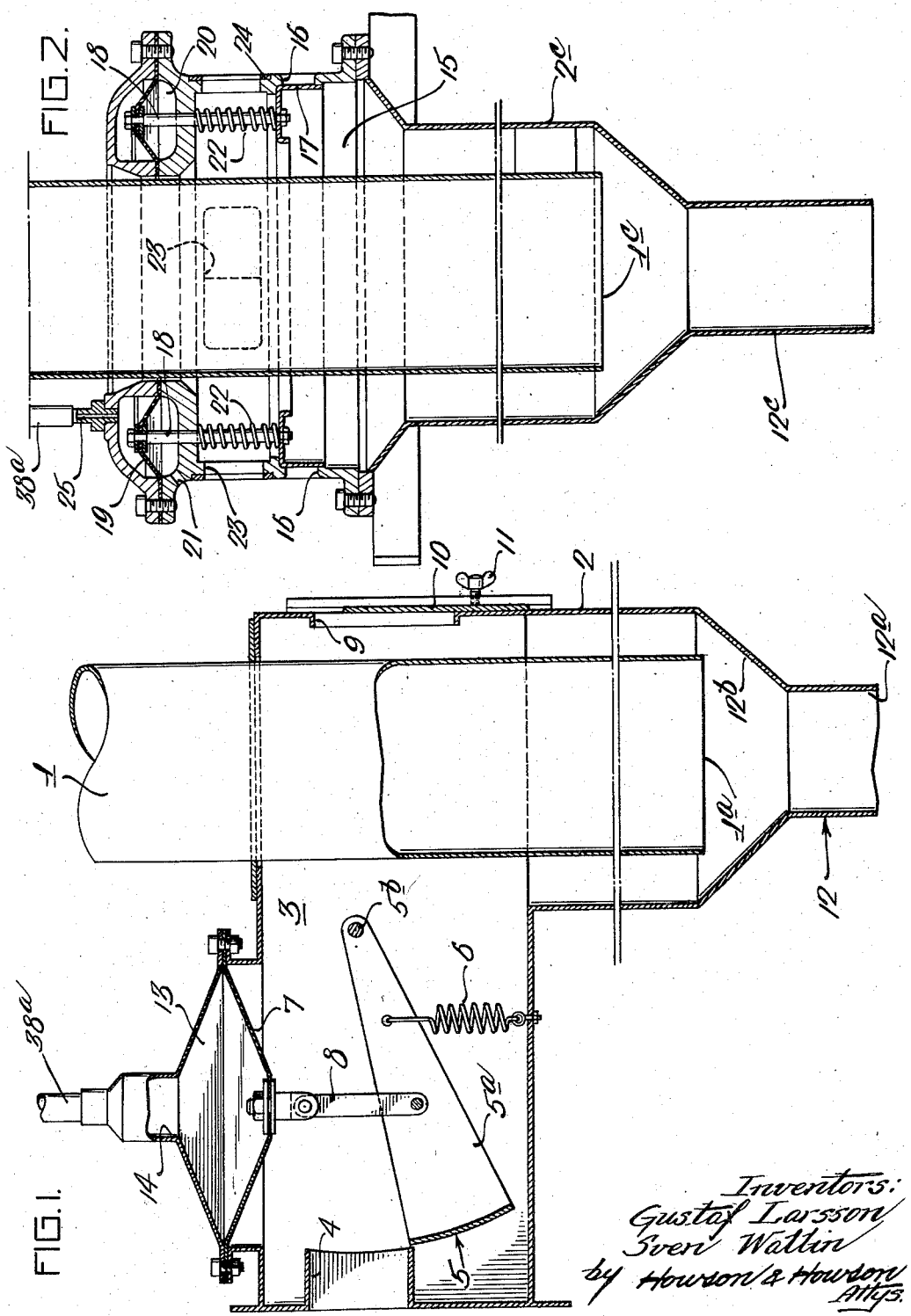

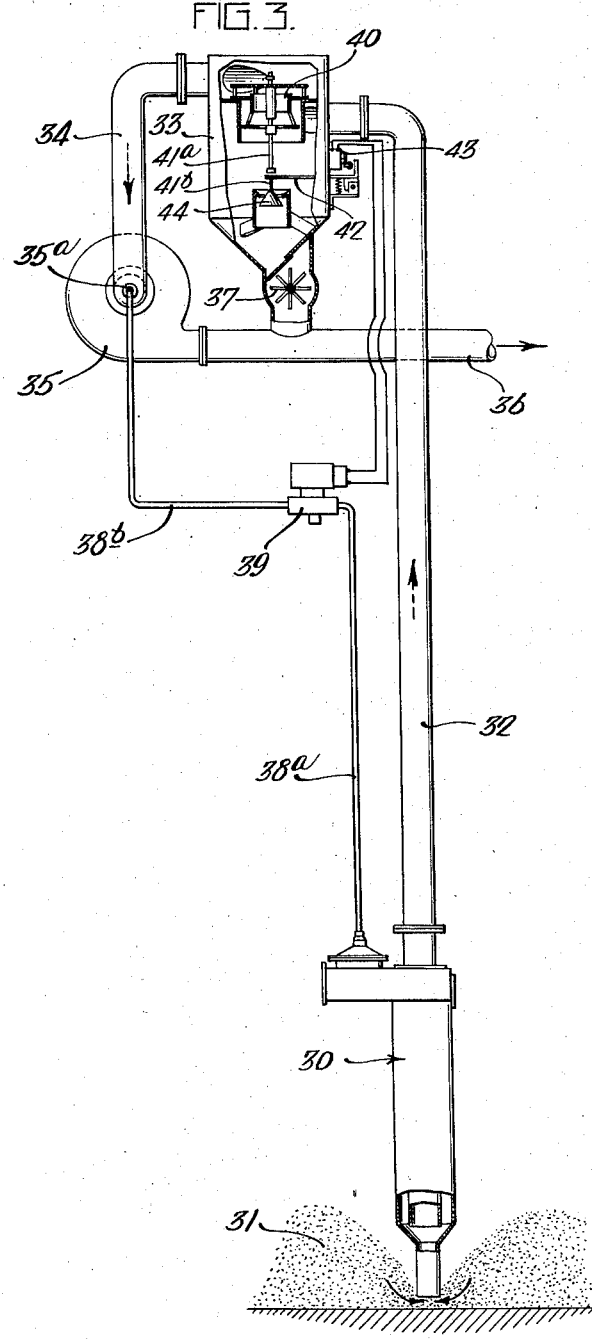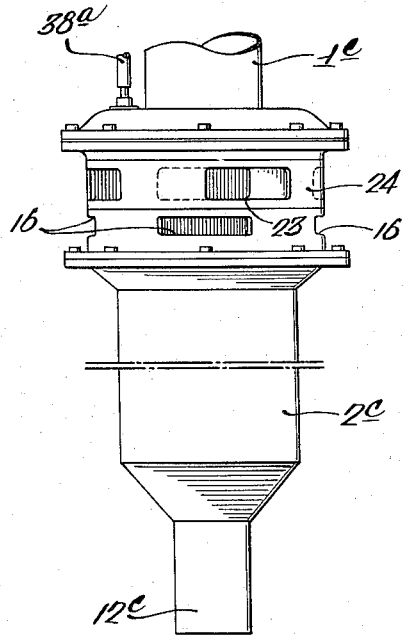

Gustaf Larsson and Sven Wallin, Jonkoping, Sweden, assignors to Aktiebolaget Svenska Flaktfabriken, Stockholm, Sweden Application September 30, 1957, Serial No. 687,275

2 Claims. (Cl. 302—17)

The present invention relates to pneumatic conveying plants for grain and similar materials, and more particularly, to apparatus for cutting off the supply of the material upon interruption in the supply of transport medium or in the discharge of the transported material. The invention has particular utility in plants where the material is fed into the conveying plant by means of a suction nozzle consisting of two concentric tubes and equipped with throttling means for automatic governing of the air supply which is directly influenced by pressure variations occurring at the suction side of the transport system.

In pneumatic conveying plants for granular materials, for instance grain, it is of great importance, that the proportion between the material and the transporting air be maintained at suitable values. In plants where the material is fed by means of sluicing wheels or similar devices the quantity of material can be rather easily regulated. It is also conventional to regulate the quantity of air in such plants by means of a volume governor arranged in the pipe system, which governor, for example, may be of the design disclosed in the Swedish patent specification 133,723 and the corresponding U.S. Patent No. 2,765,812. In plants where the material is fed into the transport system by being sucked from a material receptacle by means of suction nozzles of a special design, the proportion between the material and the transporting air can be regulated by special devices at the suction nozzle, but such devices do not entirely prevent disturbances caused by interruptions in the discharge of the material from the separating cyclone and in the succeeding transport.

The present invention relates to a simple and effective apparatus for automatic governing of the supply of material in pneumatic conveying plants of the stated type and for entirely cutting off the supply of the material upon interruptions in the supply of medium or discharge of material.

The apparatus according to the invention is characterized by an extension tube connected to the lower end of the outer tube of the suction nozzle, said extension tube projecting to such an extent below the inner tube (the transport tube) that when the air supply is at its maximum the subpressure at the mouth of the transport tube will not be sufficient to lift the material up through the extension tube. A two-way valve is mounted in the control pipe between the pneumatic conveying system proper and the automatic throttling means, and is operated by a volume governor arranged in the pneumatic conveying system and/or a discharge guard mounted in the separating device of the system for separating material from the transporting air. The two-way valve is arranged to shut off the control pipe to the automatic throttling means and to connect the throttling means to atmosphere to provide maximum air supply to the suction nozzle. The two-way valve in the control pipe of the throttling means may suitably consist of a solenoid-valve, in the control circuit of which one or more contact breakers are arranged, said breakers being mechanically actuated by said volume governor and discharge guard.

The invention will now be described more in detail with reference to the accompanying drawings, in which Fig. 1 is a vertical section through a suction nozzle improved in accordance with the invention;

Fig. 2 is a vertical section through another embodiment of such a nozzle;

Fig. 3 illustrates a pneumatic conveying plant with a suction nozzle and with co-operating governing means; and Fig. 4 is a view in side elevation of the embodiment shown in Fig. 2.

In Fig. 1 the reference members 1 and 2 stand for two concentric tubes, the inner one of which is connected to a pneumatic conveying pipe line for conveying the material, whereas the space between the tubes 1 and 2 is used for the supply of the transporting air. A chamber 3 is connected to the upper part of the outer tube 2. This chamber is provided with at least one inlet opening 4 for the transporting air. Said opening can be more or less shut off by means of a damper blade 5, which in the illustrated embodiment is fastened to a lever 5a, swingably journalled at the point 5b. The damper blade is provided with a spring 6, which tends to hold the damper blade in an open position. In one wall of the chamber 3 there is mounted a membrane 7 separating a space 13 from the chamber 3. The membrane 7 is connected with said lever 5a by means of a rod 8. The space 13 is provided with an opening 14 which is connected with the suction side of the pneumatic conveying system by a control pipe 38a.

The membrane 7, in response to variations in the subpressure existing in the space 13, by means of the rod 8 actuates the damper blade 5. The blade thereby shields the opening 4 a greater or lesser extent. In order to obtain the supply of the necessary minimum quantity of transporting air either the damper 5 can be so designed that the opening 4 is never entirely shut off, or the chamber 3 can be provided with still another opening 9, the area of which can be manually regulated by means of a small sliding door 10, equipped with a locking nut 11. An extension tube 12 is connected to the outer tube 2, and in accordance with the invention, the extension tube projects to such an extent below the mouth 1a of the inner tube, that when the air supply is at its maximum, the sub-pressure existing at the mouth 1a of the transport tube is not sufficient to lift the material up through the extension tube 12. As shown, the extension tube may be provided with a constricted part 12a and with a transition part 12b connected to the tube 2.

In the same way the designations 1c and 2c, in the embodiment shown in Figs. 2 and 4, stand for the two concentric tubes of the suction nozzle and 12c stands for the extension tube of the suction nozzle. A chamber 19 is connected to the outer tube 2c and is arranged annularly around the tube 1c. Openings 16 are provided for the inlet of the transporting air to the chamber, and are preferably uniformly spaced around the periphery of the chamber. The area of the openings 16 is regulated by means of a throttling means 17 which in the case shown is designed as an annular piston, the movement of which is effected by a membrane 19, which by means of a plurality of rods 18, is connected to said piston. The membrane 19 is arranged in a space 20, which is separated from the chamber 15. The space 20 at one side of the membrane by means of an opening 21 communicates with the atmosphere and at the other side of the membrane by means of an opening 25 of control pipe 38a is connected to the suction side of the transport system at a suitable point. A coiled spring 22 is arranged around each of the rods 18 to keep the throttling means 17 in an open position against the action of the membrane 19, which membrane, in response to the sub-pressure existing at the upper side of the membrane, tends to close said openings 16. A number of separate openings 23 are arranged to ensure the supply of a minimum quantity of transporting air and are in the same way as the openings 16 disposed about the periphery of the chamber 15 and equipped with manually adjustable sliding dampers 24.

In the pneumatic conveying plant illustrated in Fig. 3, a suction nozzle 30 is provided of the same design as that disclosed in Fig. 1, but said suction nozzle can of course also be of another design, for instance such as shown in Fig. 2. The material 31, for instance grain or the like, by means of the suction nozzle 30 is fed into the pneumatic conveying system. The suction nozzle is connected by means of a pipe line 32 in conventional manner to a separating device 33 for the separation of the material from the transporting air. The transporting air is then forwarded through a pipe 34 to the suction side 35a of a fan 35 and further to a transport pipe 36 connected to the pressure side of said fan. The material separated in the separating device 33 is fed into the transport pipe 36 by means of a sluicing wheel 37. The control means of the suction nozzle is connected to the suction side 35a of the fan by means of the pipe 38a and 38b, whereby the position of the damper for the inlet openings of the transporting air is automatically regulated in response to occurring pressure variations in the pneumatic conveying system. In order to fully cut off the supply of the material, when called for, in this pipe 28a, 38b there is arranged a solenoid valve 39, in the control circuit of which one or more breaking means or switches are inserted. In the illustrated embodiment the breaking means is designated 43. The valve 39 is so constructed, that when the control current is broken, it shuts off the connection between the suction side of the fan and the control means of the suction nozzle and instead of this connects the latter directly with the atmosphere, thereby causing the earlier mentioned dampers 5 or 17 automatically to move to a fully open position. In the illustrated embodiment, where the separating device consists of a cyclone of a design disclosed in our patent application 687,278 filed Sept. 30, 1957, the breaking means 43 is arranged to be actuated by a volume governor 40 and a discharge guard 44, which means by means of rods 41a and 41b and a lever 42 are connected to operate the breaking means 43.

The apparatus shown in Fig. 3 functions in the following way. After the quantity of air, necessary for the calculated capacity, has been adjusted by means of the manually adjustable dampers 10 or 24, the quantity of material is regulated so that the sub-pressure existing at the mouth of the transporting tube 1 or 1c is controlled by supplying a greater or smaller quantity of transporting air. This regulating of the quantity is, as stated above, effected by means of the automatic governing damper 5 or 17. The last mentioned damper operates in response to the pressure variations occurring in the system, which variations in the illustrated embodiment are detected at the suction side 35a of the fan. If, for any reason, the quantity of the transporting air should fall below a minimum value sufficient for effective operation of the plant, the volume governor 40 moves to a position, where it actuates the lever 42 and the breaking means or switch 43. As a consequence of this, the solenoid valve 39 shuts off the connection between the suction side of the fan and the control means for the suction nozzle. Thereupon, the openings 4 or 16 are entirely free and the transport of the material will entirely cease. If, on the other hand, the discharge of material from the separating cyclone 33 for any reason, for instance an interruption in the movement of the sluicing device 37, ceases, the material accumulates in the lower part of the separating device and finally actuates the discharge guard 44, which in its turn by means of the lever 42 actuates the breaking means 43 with the above-mentioned result.

The breaking means being used in the plant and in Fig. 3 designated 43, may cooperate with other impulse or governing means used in the pneumatic conveying plant. Without departing from the scope of the invention the membrane 7 or 19 may likewise be substituted by control means of different types, for instance a reversible electric motor, in which case the control pipe 38a, 38b must be replaced by electric wires.

What we claim is:

1. In pneumatic conveying plants for grain and similar material having a suction nozzle terminating adjacent the material supply for entraining the material in the transport medium, a volume governor in said conveying system for regulating the flow of transport medium therethrough, a separating device in said system for separating the material from the transport medium, a discharge guard in the separating device for detecting the flow of separated material therefrom, an outer tube surrounding the suction nozzle, and throttling means responsive to pressure variations in the suction side of the pneumatic conveying system to govern the supply of medium to said outer tube; apparatus for cutting off the supply of material upon interruption of the supply of transport medium or in the discharge of the transported material, comprising an extension tube mounted on the lower end of the outer tube and projecting into the supply of material, and operable when said throttling means affords minimum air supply to said outer tube to cause said suction nozzle to lift the material up through the extension tube and when said throttling means affords maximum air supply to said outer tube to cause said suction nozzle to be inoperable to lift the material through the extension tube and a two-way valve intermediate said throttling means and the suction side of the system operable in one position to afford normal communication therebetween, and in the other position to disconnect said throttling means from the suction side of the system, and dispose the same to afford maximum flow of transport medium to said outer tube, and connections connecting said valve to both said volume governor and said discharge guard to operate said valve to its second position upon interruption in the flow of transport medium or interruption in the discharge of the transported material.

2. Apparatus according to claim 1 wherein said two-way valve comprises a solenoid valve, and wherein further said connections include at least one switch means in the control circuit for said solenoid, said switch means being operated by displacement of said volume governor and discharge guard.

References Cited in the file of this patent

FOREIGN PATENTS

| 27,674 | Great Britain | Dec. 19, 1908 |
| 4,814 | Great Britain | Mar. 29, 1915 |
| 120,295 | Sweden | Nov. 25, 1947 |